(12) United States Patent
Shimada

(10) Patent No.: US 7,884,999 B2
(45) Date of Patent: *Feb. 8, 2011

(54) OPTICAL MICROSCOPE APPARATUS

(75) Inventor: Yoshihiro Shimada, Tokyo (JP)

(73) Assignee: Olympus Corporation, Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 12/093,409

(22) PCT Filed: Nov. 15, 2006

(86) PCT No.: PCT/JP2006/322779

§ 371 (c)(1),
(2), (4) Date: May 12, 2008

(87) PCT Pub. No.: WO2007/058223

PCT Pub. Date: May 24, 2007

(65) Prior Publication Data

US 2009/0046358 A1 Feb. 19, 2009

(30) Foreign Application Priority Data

Nov. 16, 2005 (JP) .............................. 2005-331325

(51) Int. Cl.
G02B 21/00 (2006.01)
(52) U.S. Cl. ........................ 359/368; 359/385; 359/390
(58) Field of Classification Search ......... 359/368–390, 359/896
See application file for complete search history.

(56) References Cited

U.S. PATENT DOCUMENTS

| | | | | |
|---|---|---|---|---|
| 3,490,846 A | * | 1/1970 | Kasper | ........................ 355/78 |
| 5,325,231 A | * | 6/1994 | Tamura et al. | ............... 359/387 |
| 7,649,686 B2 | * | 1/2010 | Harada et al. | ................ 359/391 |
| 2002/0044347 A1 | * | 4/2002 | Steenblik et al. | ............ 359/368 |
| 2002/0060842 A1 | | 5/2002 | Ogino et al. | |
| 2006/0119935 A1 | * | 6/2006 | Yamamoto | ................... 359/368 |

FOREIGN PATENT DOCUMENTS

| | | |
|---|---|---|
| JP | 9-178900 | 7/1997 |
| JP | 2002-148526 | 5/2002 |
| JP | 2002-182123 | 6/2002 |
| JP | 2003-5079 | 1/2003 |
| JP | 2005-168341 | 6/2005 |

(Continued)

*Primary Examiner*—Thong Nguyen
(74) *Attorney, Agent, or Firm*—Scully, Scott, Murphy & Presser, P.C.

(57) ABSTRACT

The size and production costs of an optical microscope apparatus capable of blocking light or maintaining the specimen environment are reduced. The provided optical microscope apparatus includes a microscope that has a stage for mounting a specimen (A), a transmission-illumination optical system, and a detection optical system; and a housing that surrounds the microscope, wherein the housing includes a fixed housing, and a movable housing, wherein, among optical parts constituting the transmission-illumination optical system and the image-forming optical system, at least some optical parts disposed above the stage are movable, and wherein a switching mechanism is provided, the switching mechanism being configured to retract the optical parts away from above the stage when the movable housing is disposed in an open position relative to the fixed housing and to substantially align the optical axes of both optical systems when the movable housing is disposed in a closed position relative to the fixed housing.

40 Claims, 13 Drawing Sheets

FOREIGN PATENT DOCUMENTS

| | | |
|---|---|---|
| JP | 2006-23175 | 1/2006 |
| JP | 2006-162764 | 6/2006 |
| JP | 2006-162765 | 6/2006 |
| JP | 2006-162771 | 6/2006 |
| JP | 2006-187206 | 7/2006 |
| WO | WO 2004/109361 | * 12/2004 ................. 359/385 |

* cited by examiner

OPTICAL MICROSCOPE APPARATUS

TECHNICAL FIELD

The present invention relates to an optical microscope apparatus mainly for examining biological specimens, such as cells, and includes a housing for blocking light or maintaining the specimen environment.

BACKGROUND ART

Optical microscopes are generally used as means for examining living biological cells, such as a cultured cell specimens cultured in a culture medium on a petri dish or a microplate. Recently, optical microscopes include highly sensitive image-acquisition parts, such as cooled CCD cameras, so as to detect weak fluorescence from a fluorescently-labeled cultured cell and record it as image data. Since the fluorescence from a fluorescently-labeled cultured cell is extremely weak, it is necessary to prevent, as much as possible, light other than fluorescence from the cell, i.e., ambient light, from being detected in order to accurately detect the weak fluorescence. Therefore, some of the commercially available optical microscope apparatuses have a structure in which an entire inverted microscope is covered with a housing in order to prevent external light from being detected or to prevent external light from being detected at least when an image is being acquired. For instance, an inverted microscope produced by General Electric Healthcare is an example of such an optical microscope apparatus.

This kind of optical microscope apparatus includes a housing that covers the entire inverted microscope and a computer-controllable motorized stage that can hold a microplate and that is movable in the XY directions. A door is formed in a section of the housing. The motorized stage holding a microplate moves outward through this door until it reaches a predetermined position. The operator can change or set a microplate while the motorized stage is at the predetermined position. The door opens when the motorized stage moves outward to the predetermined position in response to the operator's instruction and is closed when the motorized stage is stored inside the housing. In this way, light can be blocked from entering the entire inverted microscope, and additionally, the specimen environment can be maintained by using a life support device, such as a temperature regulator.

Safety mechanisms of the door sections of upright microscopes that have their image-forming optical system, observation optical system, and motorized stage stored in a housing are well known (for example, refer to Patent Document 1). According to Patent Document 1, detection part is provided for detecting the presence of a foreign object when a support base supporting the subject to be examined is drawn into the housing.

Patent Document 1:
Japanese Unexamined Patent Application, Publication No. 2003-5079

DISCLOSURE OF INVENTION

With a method such as that described in Patent Document 1, in which a door is opened by pushing a motorized stage against the door, the apparatus may be produced at relatively low cost. However, generation of friction between the door and the motorized stage cannot be prevented. Consequently, there is a problem in that dust caused by the friction is generated upon repeated opening and closing.

To avoid this problem, the door must be controlled so that it is opened and closed without coming into contact with the motorized stage. However, this approach suffers from the problem of increased costs.

It is satisfactory so long as the operating range of the motorized stage covers the observed region of the specimen to be examined. However, the microscope apparatus according to Patent Document 1 has a wide operating range covering the predetermined position to which the housing moved outward so as to provide the motorized stage with a function for opening and closing the door. Therefore, there are disadvantages in that a long translation guide is required, production costs increase, and the size of the apparatus increases.

A motorized stage of a microscope requires a high-accuracy translation performance. However, adjustment for increasing this accuracy becomes difficult and the time required for adjustment increases if the translation guide is long. Moreover, there is a possibility that assembly costs may increase.

The present invention has been conceived in light of the problems described above. Accordingly, it is an object of the present invention to provide a compact optical microscope that is capable of blocking light or maintaining the specimen environment at low cost.

To achieve the objects described above, the present invention provides the following solutions.

An aspect of the present invention provides an optical microscope apparatus including a microscope having a stage for mounting a specimen, a transmission-illumination optical system, and an image-forming optical system; and a housing surrounding the microscope, wherein the housing includes a fixed housing and a movable housing provided in a manner openable and closeable relative to the fixed housing, wherein, among optical parts constituting the transmission-illumination optical system or the image-forming optical system, at least some optical parts disposed above the stage are movable, and wherein a switching mechanism is provided, the switching mechanism being configured to retract some of the optical parts away from an optical axis of another optical system when the movable housing is disposed in an open position relative to the fixed housing and substantially aligns the optical axes of both optical systems when the movable housing is disposed in a closed position.

In this way, when the movable housing is opened relative to the fixed housing when changing the specimen on the stage, the optical parts disposed above the stage are retracted from above the stage. Therefore, a large space can be formed above the stage, and the specimen can be easily changed. When the movable housing is closed relative to the fixed housing, the light is blocked from reaching the microscope by the housing, and the optical axis of the optical system above the stage, constituting the microscope, and the optical axis of the optical system below the stage are substantially aligned. In this way, microscopy can be carried out with the image-forming optical system by using illumination light from the transmission-illumination optical system.

In this case, the operating range of the stage does not have to be extended in order to form a large space above the stage for changing the specimen, and an increase in the size of the apparatus can be prevented. Moreover, the operation accuracy of the stage can be improved.

In the above-described aspect, the switching mechanism may be formed by fixing some of the optical parts to the movable housing.

In this way, it is possible to easily switch between an operating state in which a large space is formed above the stage and an examination state in which the optical axes of the transmission-illumination optical system and the detection optical system are substantially aligned by merely opening or closing the movable housing relative to the fixed housing.

In the above-described aspect, the movable housing may be attached to the fixed housing in a slidable manner or may be attached to the fixed housing in a translatable manner.

It is possible to easily switch between the operating state and the examination state by merely sliding or translating the movable housing.

It is preferable that the above-described aspect be provided with a sensor for detecting an open state or a closed state of the movable housing relative to the fixed housing.

When the sensor detects an open state of the housing, the illumination is switched off since illumination light does not need to be emitted from the transmission-illumination optical system. On the other hand, when the sensor detects a closed state, examination can be automatically started.

The above-described aspect may be provided with a control unit controlling the position of the stage by receiving a detection signal from the sensor.

When the sensor detects an open state of the housing, the specimen can be changed while the housing is open. Therefore, operability can be improved by operating the control unit to move the stage to a position where the specimen can be easily changed. After the sensor detects a closed state, microscopy is performed. Therefore, work can be reduced by operating the control unit to automatically set the stage to the observation position.

In the above-described aspect, the image-forming optical system may further include image-acquisition part for acquiring an image of a specimen on the stage and a control unit for controlling the image-acquisition part by receiving a detection signal from the sensor.

The operator's work can be reduced by operating the control unit to automatically start the examination process when the sensor detects a closed state of the housing.

The above-described aspect may be provided with a light source for illuminating a specimen on the stage and a control unit for controlling the light source by receiving a detection signal from the sensor.

By operating the control unit to turn off the light source when the sensor detects an open state of the housing, the operator can change the specimen without being bothered by bright light.

A temperature regulator for regulating the temperature inside the housing and a control unit for controlling the temperature regulator by receiving a detection signal from the sensor may be provided.

Furthermore, a carbon-dioxide-gas supplier for adjusting the carbon-dioxide-gas concentration inside the housing and a control unit for controlling the carbon-dioxide-gas supplier by receiving a detection signal from the sensor may be provided.

In this way, the temperature regulator and carbon-dioxide-gas supplier can be prevented from unnecessarily operating when the sensor detects an open state of the housing.

In the above-described aspect, a microplate containing a specimen may be mounted on the stage.

In the above-described aspect, said some optical parts are attached to the movable housing, and the transmission-illumination optical system may further include a light source, some of the optical parts, and an optical fiber for transmitting illumination light from the light source to the optical parts.

Since electrical parts do not have to be disposed in the movable housing, electrical wires, which would be displaced when the movable housing is moved, do not have to be provided, and the durability of the apparatus can thus be improved.

In the above-described aspect, anti-reflection treatment for visible light may be applied to the inner walls of the fixed housing and the movable housing.

Furthermore, the above-described aspect may be provided with a light-blocking member for blocking light from entering a gap between the fixed housing and the movable housing when the movable housing is closed relative to the fixed housing.

In the above-described aspect, edges of the fixed housing and the movable housing may have an engaged structure when the movable housing is closed relative to the fixed housing.

The present invention is advantageous in that a compact optical microscope that is capable of blocking light and maintaining the specimen environment at low cost is provided.

EXPLANATION OF REFERENCE SIGNS

Figure 1:
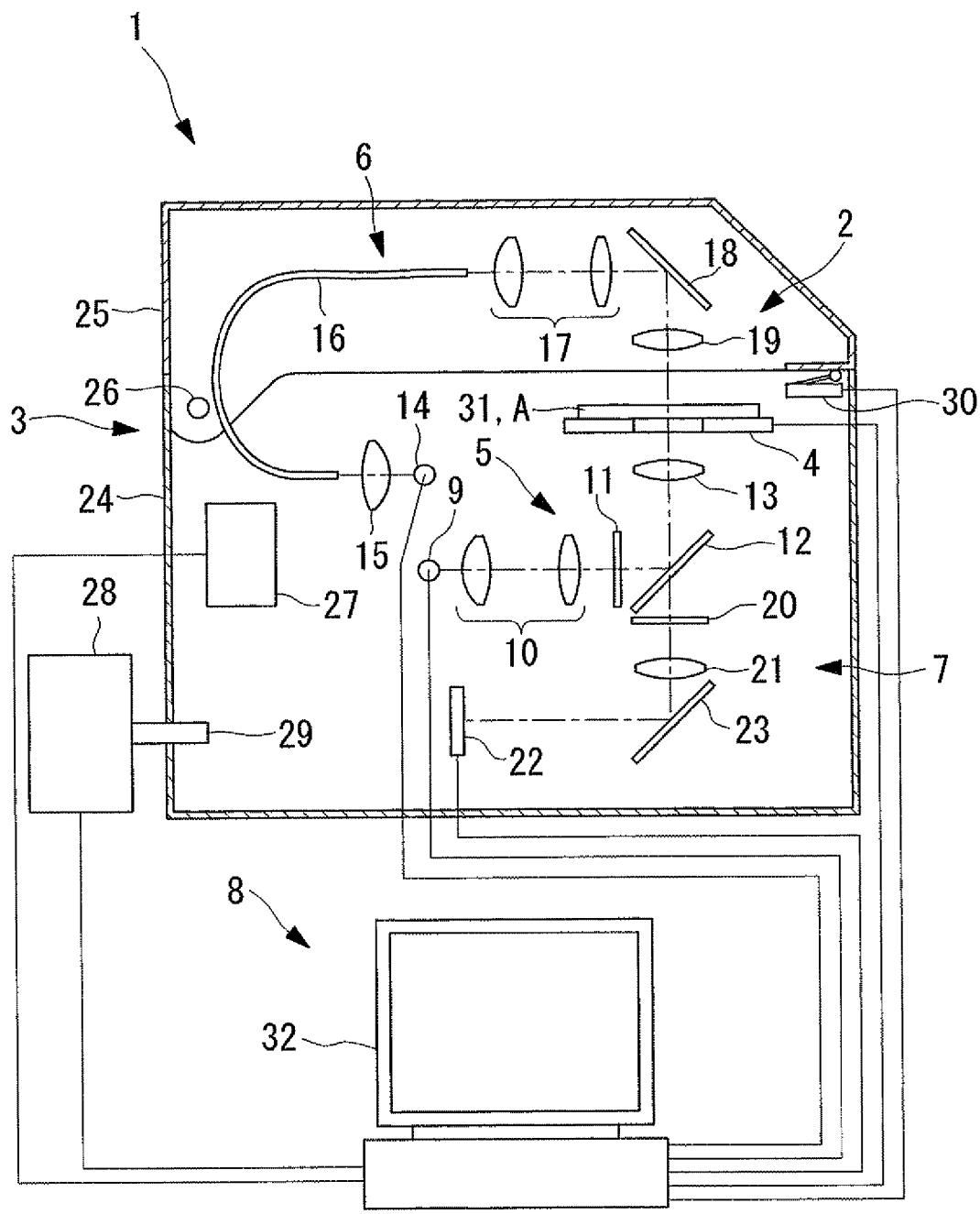
FIG. 1 is a schematic longitudinal sectional view illustrating, in outline, an optical microscope apparatus according to a first embodiment of the present invention.

A: specimen
1, 40, and 50: optical microscope apparatus
2: inverted microscope (microscope)
3, 41, and 52: housing
4: motorized stage (stage)
6 and 56: transmission-illumination optical system
7 and 57: detection optical system (image-forming optical system)
8: control unit
9: xenon lamp (light source)
14: halogen lamp (light source)
16: optical fiber
17: collector lens (optical part)
18: mirror (optical part)
19: condenser lens (optical part)
22: CCD camera (image-acquisition part)
24, 42, and 53: fixed housing
25, 44, and 54: movable housing
28: carbon-dioxide-gas supplier
30: sensor
31: microplate
51: upright microscope (microscope)

BEST MODE FOR CARRYING OUT THE INVENTION

First Embodiment

Figure 2:
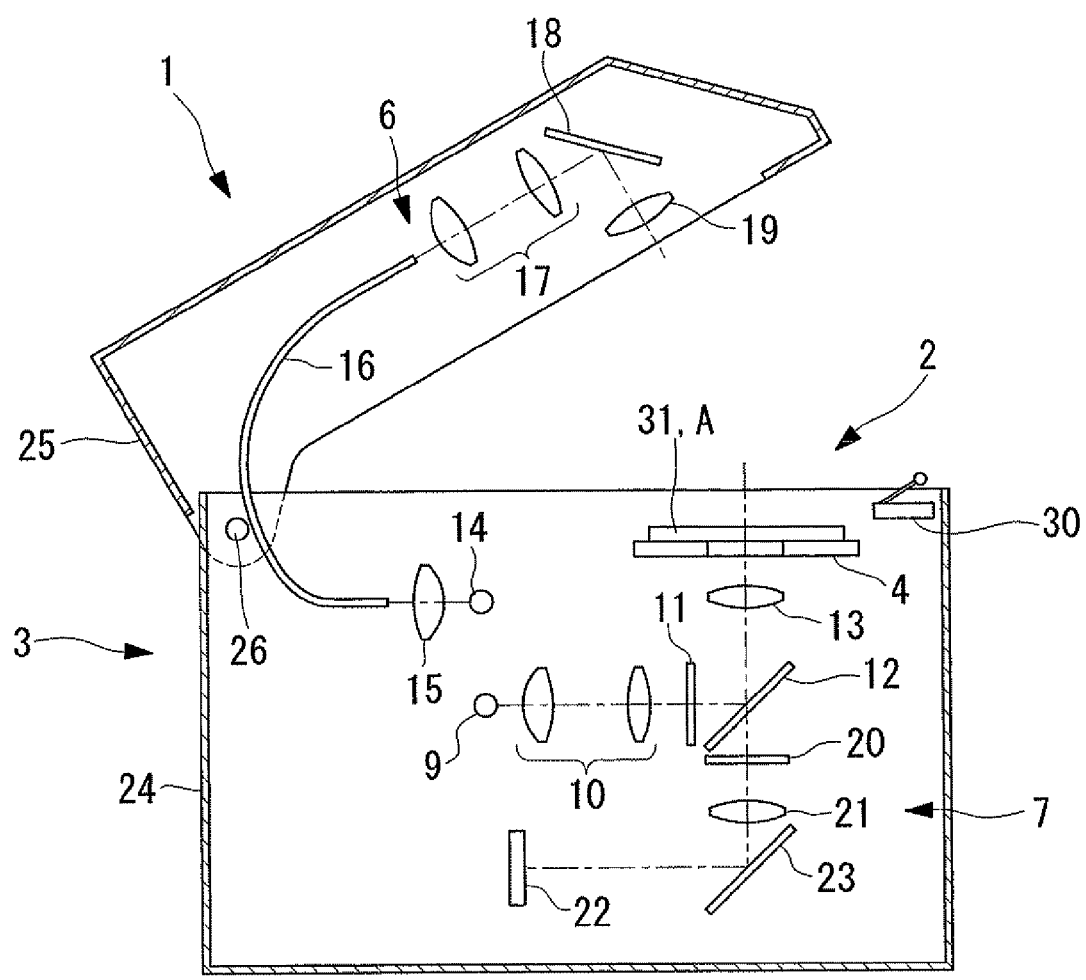
FIG. 2 is a schematic longitudinal sectional view illustrating the optical microscope apparatus shown in FIG. 1, where a movable housing is in an open state.
Figure 3:
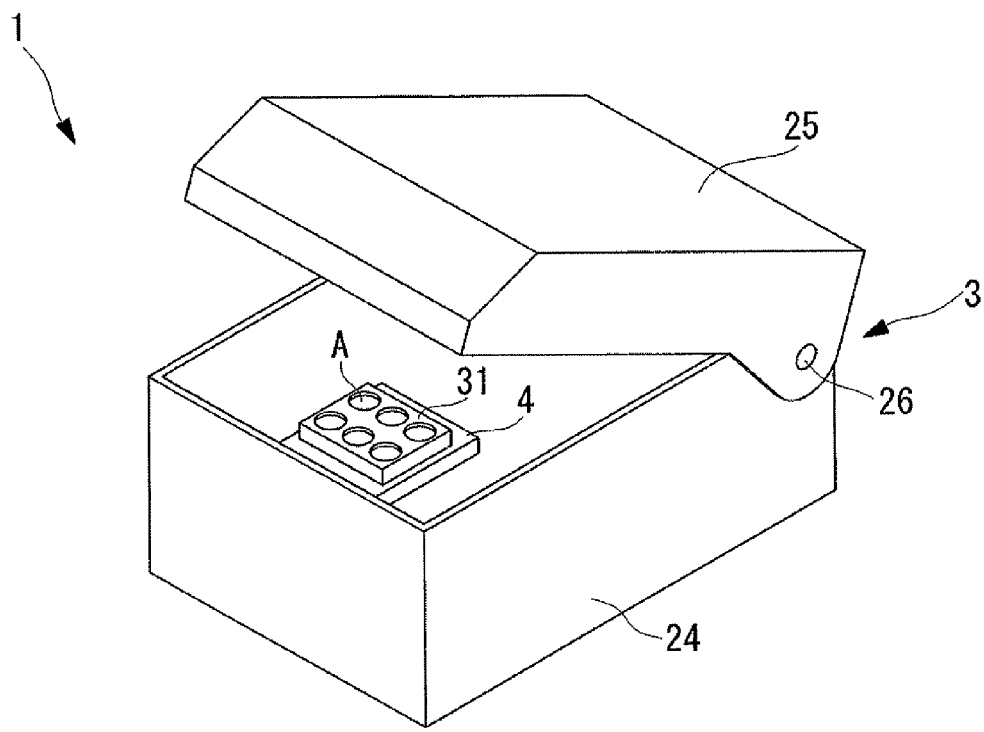
FIG. 3 is a perspective view illustrating the external shape of the optical microscope apparatus shown in FIG. 1.

An optical microscope apparatus 1 according to a first embodiment of the present invention will be described below with reference to FIGS. 1 to 3.

As shown in FIG. 1, the optical microscope apparatus 1 according to the first embodiment includes an inverted microscope 2 and a housing 3 that contains the inverted microscope 2.

The inverted microscope 2 includes a motorized stage 4 on which a specimen A is fixed using a clamping mechanism (not shown); an epi-illumination optical system 5 that is disposed below the motorized stage 4 and that irradiates the specimen A placed on the motorized stage 4 with excitation light vertically from below; a transmission-illumination optical system 6 that is disposed above the motorized stage 4 and that irradiates the specimen A with white light vertically from above; a detection optical system (image-forming optical system) 7 that detects fluorescence and transmitted light emitted downward from the specimen A; and a control unit 8.

The epi-illumination optical system 5 includes a xenon lamp 9; collector lenses 10 that collect the light emitted from the xenon lamp 9; a wavelength selecting filter 11 that selectively transmits excitation light having a specific wavelength; a dichroic mirror 12 that reflects the excitation light transmitted through the wavelength selecting filter 11; and an objective lens 13 that focuses the excitation light reflected at the dichroic mirror 12 in order to irradiate the specimen A.

The transmission-illumination optical system 6 includes a halogen lamp 14; a coupling lens 15 that collects the white light emitted from the halogen lamp 14; an optical fiber 16 that receives the white light collected by the coupling lens 15 at one end thereof; collector lenses 17 that collect the white light transmitted through the optical fiber 16 and emitted from the other end thereof; a mirror 18 that reflects the white light collected by the collector lenses 17 and directs the white light vertically downward; and a condenser lens 19 that focuses the white light reflected at the mirror 18. The optical fiber 16 is, for example, a flexible optical fiber, such as liquid fiber, which can be freely bent.

The detection optical system 7 includes a wavelength selecting filter 20 that shares the objective lens 13 and the dichroic mirror 12 with the epi-illumination optical system 5 and that transmits the fluorescence generated at the specimen A, collected by the objective lens 13, and transmitted through the dichroic mirror 12; an image-forming lens 21 that collects the fluorescence transmitted through the wavelength selecting filter 20; and a CCD camera 22 that detects the fluorescence collected by the image-forming lens 21. In the drawing, reference numeral 23 indicates a mirror.

The housing 3 has a fixed housing 24 on the lower side and a movable housing 25 on the upper side. The movable housing 25 is supported at the fixed housing 24 with a rotation mechanism (not shown), such as a bearing, in such a manner as to be rotatable around a rotary shaft 26 so that the movable housing 25 transitions from a closed state shown in FIG. 1 to an open state shown in FIG. 2. When in the closed state, the housing 3 blocks light from the outside to keep light from being incident on the inverted microscope 2.

In the transmission-illumination optical system 6, the halogen lamp 14, the coupling lens 15, and one end of the optical fiber 16 are fixed to the fixed housing 24, whereas the other end of the optical fiber 16, the collector lenses 17, the mirror 18, and the condenser lens 19 are fixed to the movable housing 25. A temperature regulator 27 for regulating the temperature inside the housing 3 is disposed inside the housing 3. A carbon-dioxide-gas supplier 28 that supplies carbon dioxide gas into the housing 3 is connected to the housing 3 via a duct 29. A sensor 30, such as a microswitch or a photo-interrupter, for detecting the open/closed states of the fixed housing 24 and the movable housing 25 is interposed therebetween.

The control unit 8 is connected to the motorized stage 4, the xenon lamp 9, the halogen lamp 14, the CCD camera 22, the temperature regulator 27, the carbon-dioxide-gas supplier 28, and the sensor 30.

The operation of the optical microscope apparatus 1 according to the first embodiment, having the above-described structure, will be described below.

To examine a specimen using the optical microscope apparatus 1 according to the first embodiment, first the operator operates the movable housing 25 to open the movable housing 25 relative to the fixed housing 24. As shown in FIG. 2, the movable housing 25 is maintained at a raised position by a clamping mechanism, not shown in the drawing.

At this time, since the transmission-illumination optical system 6, which is disposed above the motorized stage 4, is raised together with the movable housing 25, the motorized stage 4 is exposed, with a large space provided above it. In this state, the operator mounts and fixes a microplate 31 on the motorized stage 4, wherein a specimen A, such as fluorescently-labeled cultured cells, is stored in a container such as the microplate 31.

At this time, since the sensor 30 detects the open state when the movable housing 25 is opened relative to the fixed housing 24, the control unit 8 may operate the motorized stage 4 on the basis of the detection signal to move the motorized stage 4 to a position where the specimen A can be easily placed thereon. In this way, operability can be improved.

When the operator fixes the microplate 31 holding the specimen A and closes the movable housing 25, the sensor 30 outputs a detection signal corresponding to the closed state. In this state, the optical axis of the condenser lens 19 of the transmission-illumination optical system 6 provided on the movable housing 25 is aligned with the optical axis of the objective lens 13.

The control unit 8, upon receiving the detection signal for the closed state from the sensor 30, drives the motorized stage 4 to a predetermined position in accordance with a program that is set in advance. Then, the control unit 8 operates the halogen lamp 14 or the xenon lamp 9 and operates the CCD camera 22 to automatically begin image acquisition of the specimen A. Driving of the motorized stage 4 may be carried out, for example, by automatically and sequentially acquiring images of the wells in the microplate 31 containing the specimen A or by carrying out a focusing operation by controlling a focusing unit (not shown) of the objective lens 13.

By automatically acquiring images, the operator's work can be reduced.

Image information acquired by the CCD camera 22 through image acquisition is processed at the control unit 8 and is displayed on a monitor 32 as a fluorescence image.

The control unit 8 receives a detection signal from the sensor 30 to turn on and off the halogen lamp 14 and the xenon lamp 9. More specifically, when it is detected that the operator has opened the movable housing 25, the halogen lamp 14 and the xenon lamp 9 are turned off, whereas, when it is detected that the movable housing 25 is closed, the halogen lamp 14 and the xenon lamp 9 are turned on. In this way, the operator can set the specimen A comfortably without the light shining in his or her eyes, and electric power consumption can be reduced. Similarly, by controlling the temperature regulator 27 and the carbon-dioxide-gas supplier 28 with the control unit 8 on the basis of a detection signal from the sensor 30, electric power consumption and emission of carbon dioxide gas can be reduced.

In the optical microscope apparatus 1 of the first embodiment, having the above-described structure, a large space can be formed above the motorized stage 4 by opening the movable housing 25 relative to the fixed housing 24 to retract the transmission-illumination optical system 6, which is disposed above the motorized stage 4, together with the movable housing 25. In this way, the operator can easily change the specimen A in the large space. At this time, since the motorized stage 4 does not need to be moved, the stroke of the motorized stage 4 does not have to be increased for changing the specimen A. Accordingly, the motorized stage 4 requires only a minimum operating range and the translation guide can be short. Therefore, the adjustment operation can be simplified, the production costs can be reduced, and the size of the apparatus can be reduced.

In the optical microscope apparatus 1 of the first embodiment, since an electrical system is not provided in the movable housing 25, electrical wiring is not required. Therefore, disadvantages such as wear and tear of electrical wires due to the opening and closing movement can be prevented.

Figure 4:
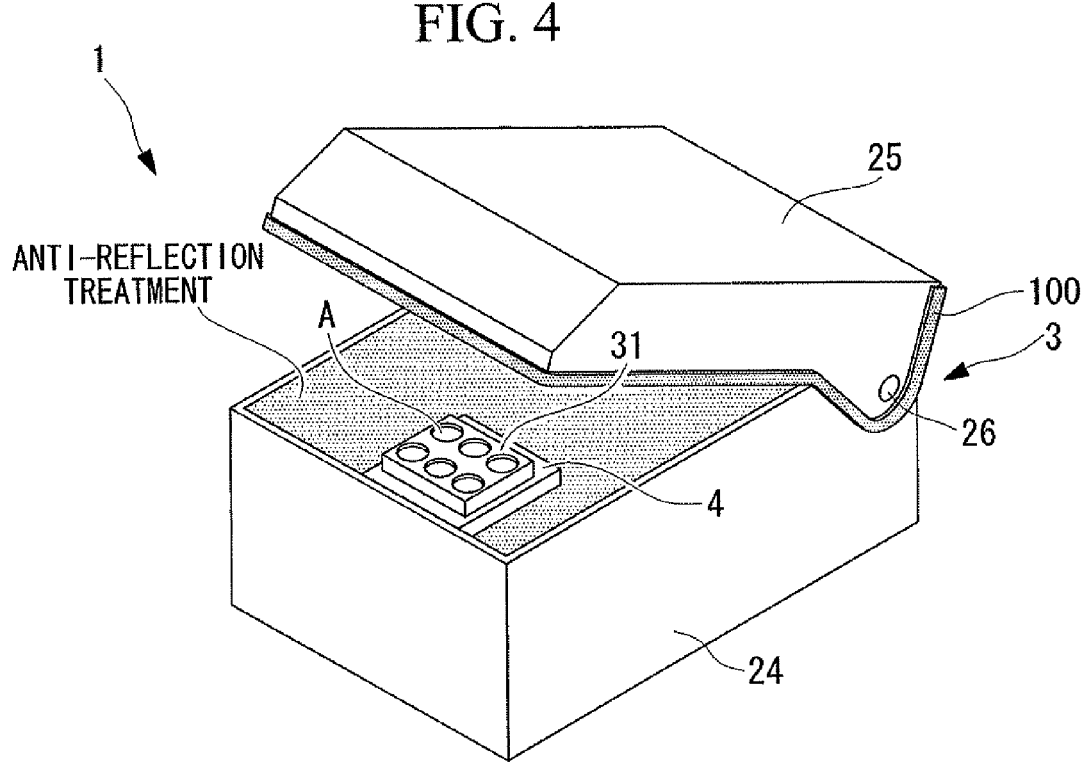
FIG. 4 is a perspective view illustrating the external shape of an optical microscope apparatus according to a modification of the first embodiment, having a light-blocking member provided along the edge of a movable housing.
Figure 5:
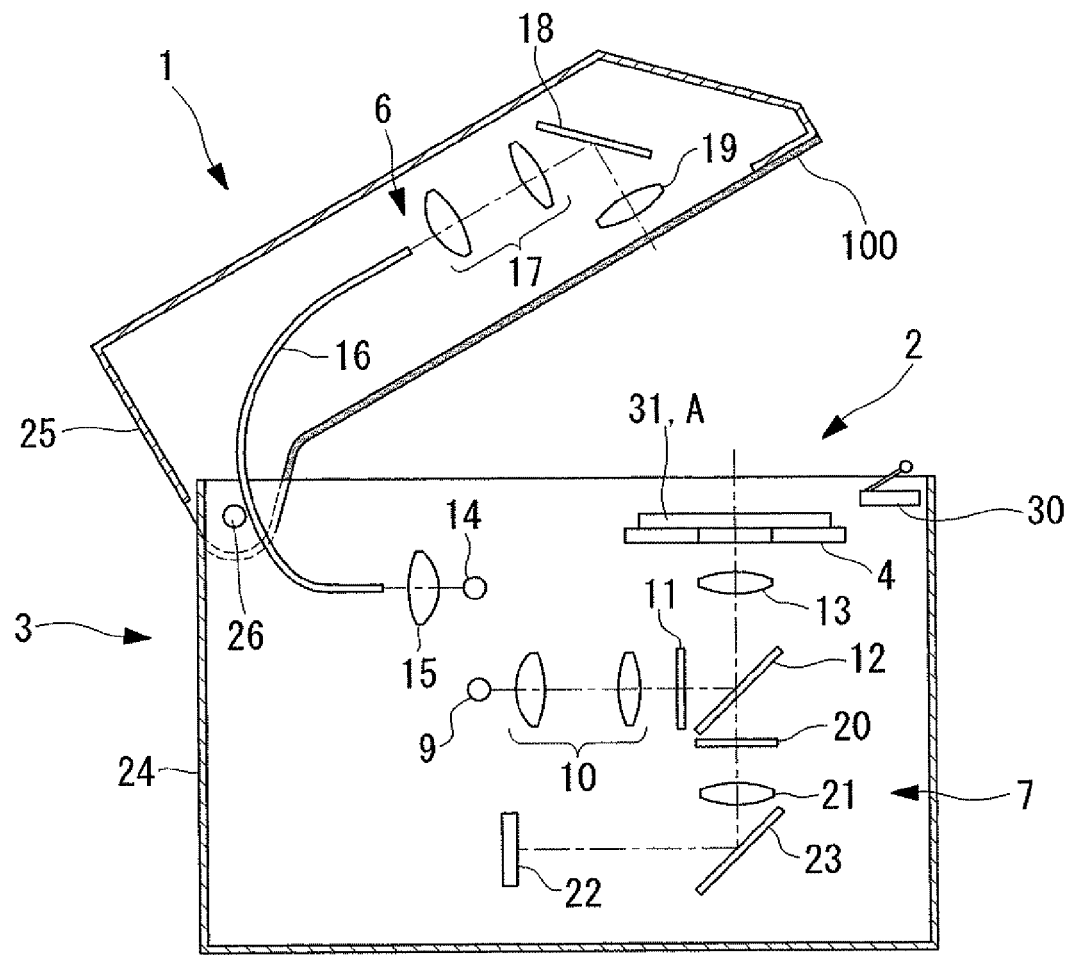
FIG. 5 is a schematic longitudinal sectional view illustrating the optical microscope apparatus shown in FIG. 4, where the movable housing is in an open state.
Figure 6:
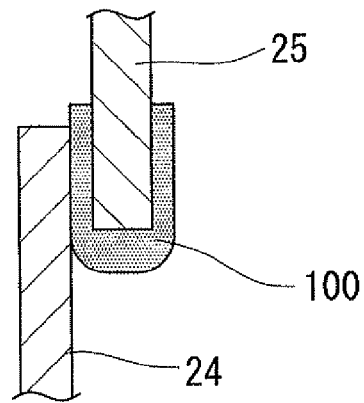
FIG. 6 is an enlarged longitudinal sectional view illustrating an engagement structure of the edge of a fixed housing and the edge of a movable housing of the optical microscope apparatus shown in FIG. 4, where the movable housing is in a closed state.

In the first embodiment, as shown in FIGS. 4 and 5, a light-blocking member 100 may be attached along the edge of the movable housing 25. As shown in FIG. 6, when the movable housing 25 is closed relative to the fixed housing 24, the edge of the fixed housing 24 and the edge of the movable housing 25 engage in an overlapping manner. Since the light-blocking member 100 fills the gap between the fixed housing 24 and the movable housing 25, visible light can be prevented from entering the housing 3.

The light-blocking member 100 may be composed of black rubber, plastic, or a metal cap. The light-blocking member 100 has a substantially U-shaped cross-section that covers the edge of the movable housing 25 and has a thickness of approximately 1 to 5 mm. The light-blocking member 100 may be provided on the fixed housing 24.

Figure 7:
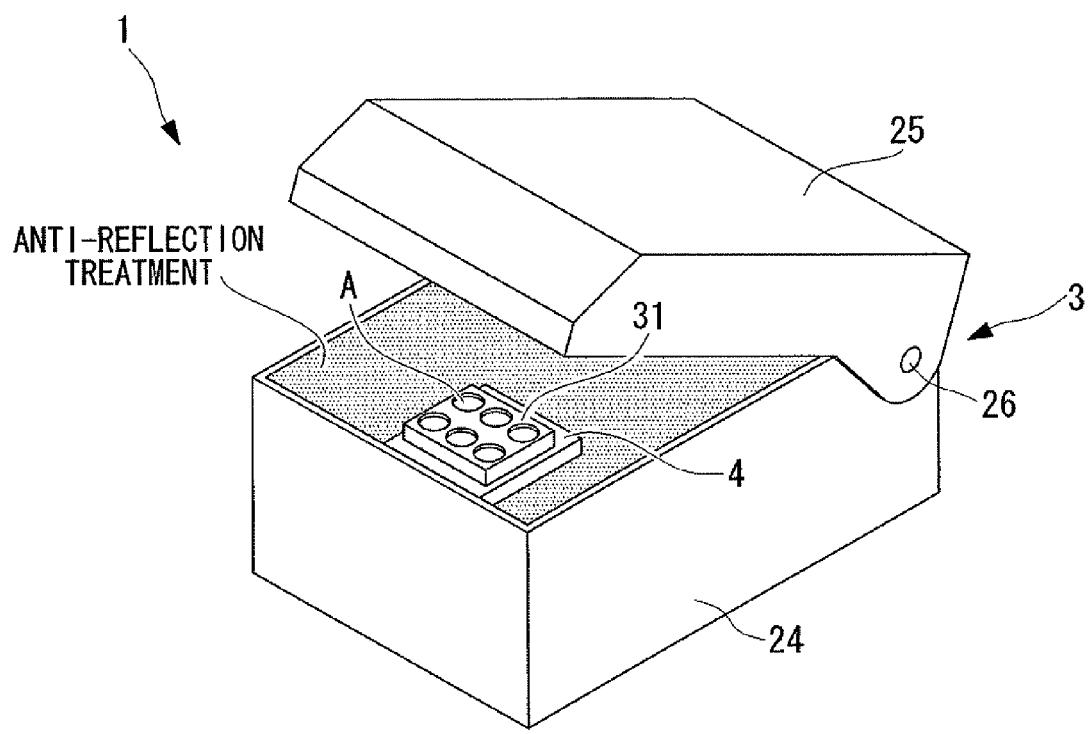
FIG. 7 is a perspective view illustrating the external shape of an optical microscope apparatus according to a modification of the first embodiment in which anti-reflection treatment is applied to the entire inner surface of the fixed housing and the movable housing.
Figure 8:
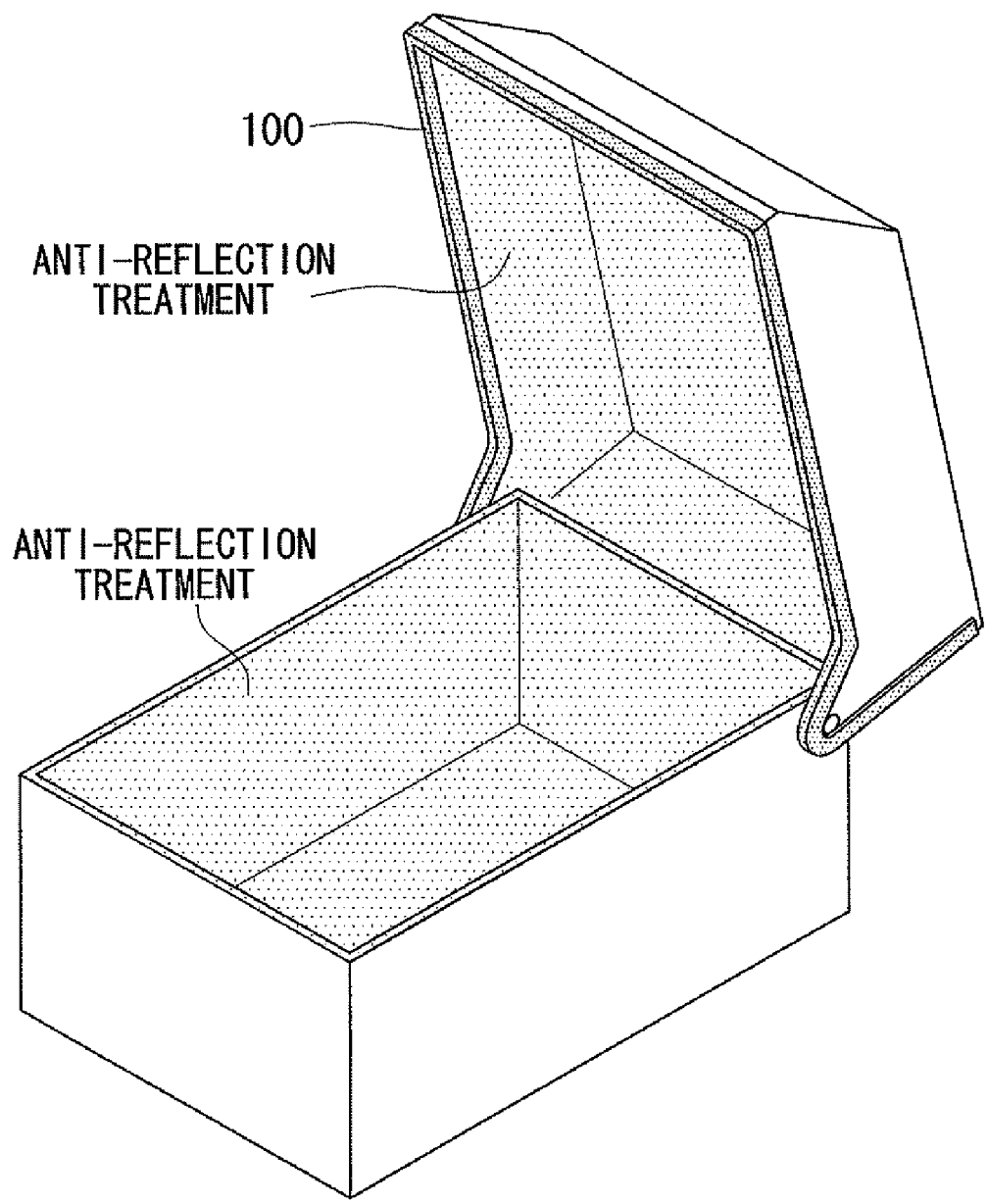
FIG. 8 is another perspective view illustrating the inner surface of the fixed housing and the movable housing of the optical microscope apparatus shown in FIG. 7.

As shown in FIGS. 7 and 8, anti-reflection treatment may be applied to the entire inner surface of the fixed housing 24 and the movable housing 25. As the anti-reflection treatment, black paint may be applied. Alternatively, as the anti-reflection treatment, a black sheet may be bonded to the entire inner surface or black alumite may be applied thereto.

Figure 9:
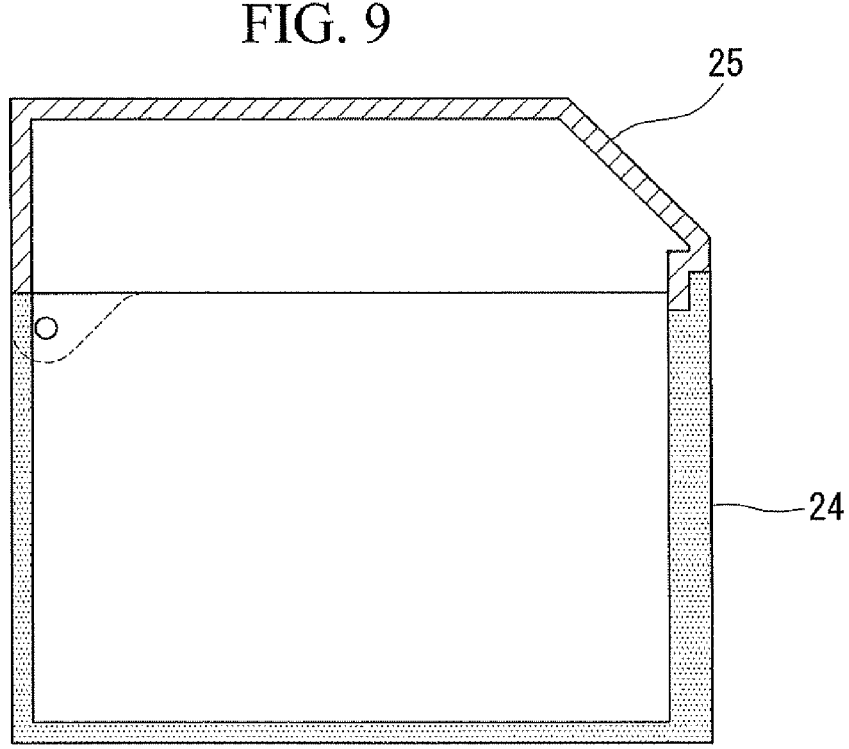
FIG. 9 is a longitudinal sectional view illustrating a main body of an optical microscope apparatus according to a modification of the first embodiment, where the edge of a movable housing is engaged with an inner edge of a fixed housing.
Figure 10:
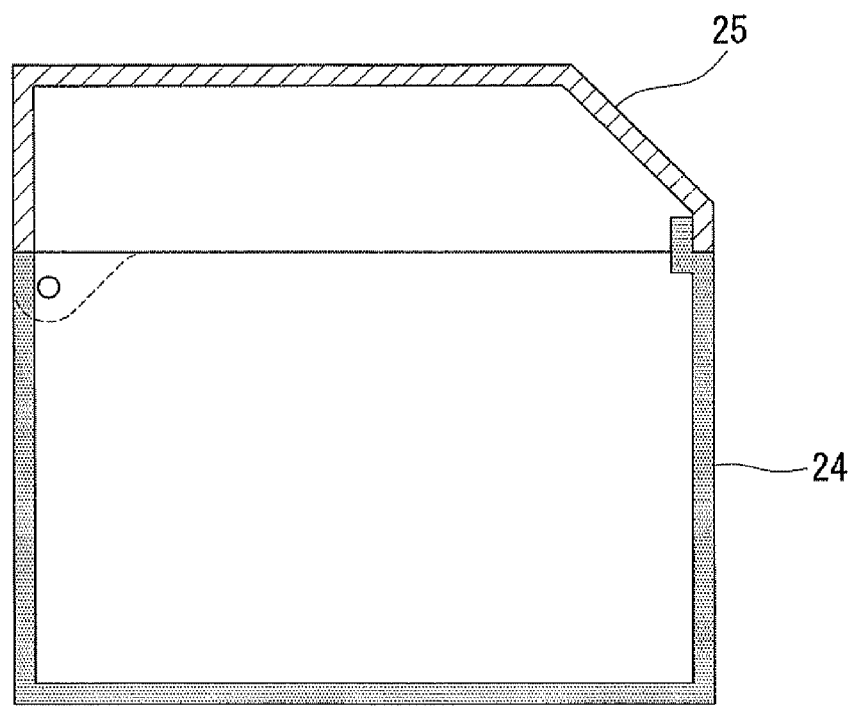
FIG. 10 is a longitudinal cross-sectional view illustrating the main body of the optical microscope apparatus according to a modification of the first embodiment, where the edge of the movable housing is engaged with an outer edge of the fixed housing.

As shown in FIGS. 9 and 10, an engagement structure in which the edges of the fixed housing 24 and the movable housing 25 overlap with each other may be employed. In the example shown in FIG. 9, the edge of the movable housing 25 engages with the inner side of the edge of the fixed housing 24. In the example shown in FIG. 10, the edge of the movable housing 25 engages with the outer side of the edge of the fixed housing 24. By employing such an engagement structure, external noise light can be prevented from entering the housing 3 through the gap between the movable housing 25 and the fixed housing 24.

Figure 11:
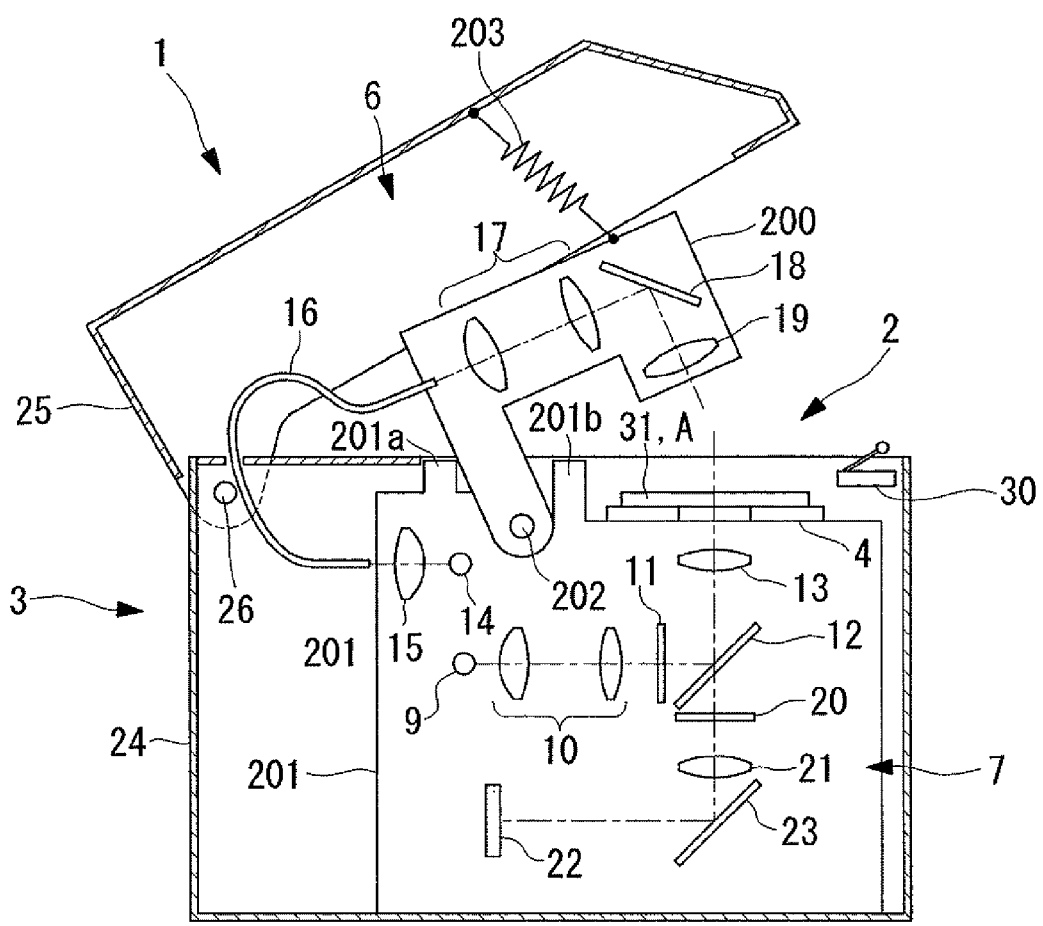
FIG. 11 is a schematic longitudinal sectional view illustrating an optical microscope apparatus according to another modification of the first embodiment.

In the first embodiment, some of the optical parts of the transmission-illumination optical system 6, i.e., the other end of the optical fiber 16, the collector lenses 17, the mirror 18, and the condenser lens 19, are fixed to the movable housing 25. However, these optical parts do not necessarily have to be fixed to the movable housing 25. For example, as shown in FIG. 11, a transmission-illumination optical unit 200 including the other end of the optical fiber 16, the collector lenses 17, the mirror 18, and the condenser lens 19 may be supported on the fixed housing 24 and the movable housing 25 by a rotary support mechanism 202 and a spring 203.

More specifically, the transmission-illumination optical unit 200 may be supported by the rotary support mechanism 202 provided on a frame 201 of the inverted microscope 2 in such a manner as to be rotatable around a predetermined rotary shaft and may be supported by the spring 203 that connects the movable housing 25 and the transmission-illumination optical unit 200 in such a manner that the transmission-illumination optical unit 200 retracts from the optical axis as the movable housing 25 is opened.

In such a case, the movable range of the transmission-illumination optical unit 200 is limited by stoppers 201a and 201b provided on the frame 201 of the inverted microscope 2. By closing the movable housing 25, the transmission-illumination optical unit 200 rotates clockwise in the drawing due to gravity and is positioned by the stopper 201b. At this time, in the transmission-illumination optical system 6, the optical axis of the condenser lens 19 is aligned with the optical axis of the objective lens 13.

Second Embodiment

Figure 12:
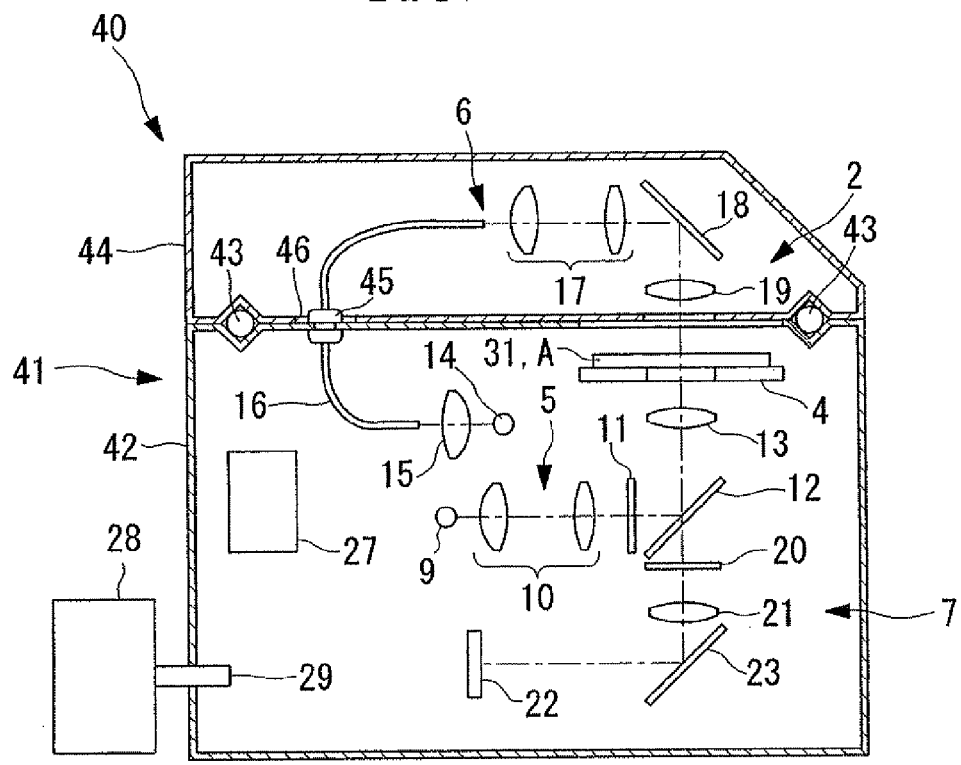
FIG. 12 is a schematic longitudinal sectional view illustrating, in outline, an optical microscope apparatus according to a second embodiment of the present invention.

Next, an optical microscope apparatus 40 according to a second embodiment of the present invention will be described with reference to FIGS. 12 to 14.

In the description of the second embodiment, parts that are the same as those in the above-described optical microscope apparatus 1 according to the first embodiment will be indicated by the same reference numerals.

The structure of a housing 41 of the optical microscope apparatus 40 according to the second embodiment differs from the first embodiment. However, the inverted microscope 2 provided inside has exactly the same structure.

The housing 41 of the optical microscope apparatus 40 according to the second embodiment includes a movable housing 44 that is movable in the horizontal direction by translation guides 43 and that is provided on a fixed housing 42, which is disposed on the lower side. A clicking mechanism (not shown) is interposed between the fixed housing 42 and the movable housing 44 so that the movable housing 44 is capable of maintaining an open state and a closed state relative to the fixed housing 42.

The optical fiber 16 extends between the fixed housing 42 and the movable housing 44. The optical fiber 16 is fixed at an intermediate position in the longitudinal direction by a bushing 45 that passes through the upper surface of the fixed housing 42. A longitudinal hole 46 that prevents the bushing 45 from interfering with the movable housing 44 during the transition between an open state to a closed state is formed in the wall of the movable housing 44 at a position corresponding to the bushing 45.

When the movable housing 44 is placed in a closed position relative to the fixed housing 42, the optical axis of the condenser lens 19 of the transmission-illumination optical system 6 provided on the movable housing 44 is substantially aligned with the optical axis of the objective lens 13. The movable housing 44 is maintained so that it is fixed at this position by the action of the clicking mechanism. This state is a light-blocked state in which outside light is blocked from entering the space inside the housing 41.

In contrast, when the operator moves the movable housing 44 to an open state, the transmission-illumination optical system 6 is retracted together with the movable housing 44. Therefore, a large space can be formed above the motorized stage 4. In this way, the operator can easily change and fix the specimen A in this large space.

In the optical microscope apparatus 40 of the second embodiment, having the above-described structure, the optical microscope apparatus 40 can be opened and closed by merely sliding the movable housing 44 in the horizontal direction relative to the fixed housing 42. This is advantageous in that a large force is not required for operation, and thus, operability is good.

In the second embodiment, the halogen lamp 14 is provided inside the fixed housing 42. However, the halogen lamp 14 may be provided outside the housing 41 as a lamp unit.

Third Embodiment

Next, an optical microscope apparatus 50 according to a third embodiment of the present invention will be described with reference to FIGS. 15 to 19.

In the description of the third embodiment, parts that are the same as those in the above-described optical microscope apparatus 1 according to the first embodiment or the optical microscope apparatus 40 according to the second embodiment will be indicated by the same reference numerals.

An optical microscope apparatus 50 according to the third embodiment includes an inverted microscope 51 and a housing 52 that contains the inverted microscope 51. Similar to the optical microscope apparatus 40 according to the second embodiment, the housing 52 opens and closes by sliding a movable housing 54 in the horizontal direction relative to a fixed housing 53.

The inverted microscope 51 includes a motorized stage 4 on which a specimen A is placed; an epi-illumination optical system 55 that is disposed above the motorized stage 4 and that irradiates the specimen A placed on the motorized stage 4 with excitation light vertically from above; a transmission-illumination optical system 56 that is disposed below the motorized stage 4 and that irradiates the specimen A with white light vertically from below; a detection optical system 57 that detects fluorescence and transmitted light emitted upward from the specimen A; and a control unit 8 (not shown).

The epi-illumination optical system 55 includes a xenon lamp 9; a coupling lens 58 that collects the light emitted from the xenon lamp 9; an optical fiber 59 that receives the excitation light collected by the coupling lens 58 at one end thereof; collector lenses 60 that collect the excitation light transmitted through the optical fiber 59 and emitted from the other end thereof; a wavelength selecting filter 11 that selectively transmits excitation light having a specific wavelength; a dichroic mirror 12 that reflects the excitation light transmitted through the wavelength selecting filter 11; a mirror 61 that reflects the excitation light reflected at the dichroic mirror 12 vertically downward; and an objective lens 13 that focuses the excitation light reflected at the mirror 61 in order to irradiate the specimen A. The optical fiber 59 is, for example, a flexible optical fiber, such as liquid fiber, which can be freely bent.

The transmission-illumination optical system 56 includes a halogen lamp 14; collector lenses 17 that collect the white light from the halogen lamp 14; a mirror 18 that reflects the white light collected by the collector lenses 17 and directs the white light vertically upward; and a condenser lens 19 that focuses the white light reflected at the mirror 18.

The detection optical system 57 shares the objective lens 13, the mirror 61, and the dichroic mirror 12 with the epi-illumination optical system 55.

The xenon lamp 9, the coupling lens 58, and one end of the optical fiber 59 of the epi-illumination optical system 55 are disposed inside the fixed housing 53. The other end of the optical fiber 59, the collector lenses 60, the wavelength selecting filter 11, the dichroic mirror 12, the mirror 61, and the objective lens 13 are fixed to the movable housing 54 by a frame (not shown).

A wavelength selecting filter 20 and an image-forming lens 21 that constitute the detection optical system 57 are also fixed to the movable housing 54. A CCD camera 22 is disposed inside the fixed housing 53. Through-holes 62 and 63 that are aligned with the movable housing 54 in a closed state are formed in the walls of the movable housing 54 and the fixed housing 53, which are disposed along the optical axis from the image-forming lens 21 to the CCD camera 22. Through-holes 64 and 65 that are aligned with the movable housing 54 in a closed state are formed in the walls of the movable housing 54 and the fixed housing 53, which are interposed between the motorized stage 4 and the objective lens 13.

As shown in FIGS. 16 to 19, the optical fiber 59 that extends between the fixed housing 53 and the movable housing 54 is fixed to the wall of the fixed housing 53 at an intermediate position by a bushing 45. A longitudinal hole 66 for containing the bushing 45 is formed in the movable housing 54 at the respective position so that the movable housing 54 does not interfere with the optical fiber 59 even when the movable housing 54 moves.

A light-blocking member, such as a light-blocking cloth (not shown), is provided on the movable housing 54 or the fixed housing 53. When the movable housing 54 is in a closed state, the light-blocking member blocks light from entering the gap between the housings 53 and 54 so that outside light does not enter the housing 52 through the through-holes 62 to 65.

Figure 13:
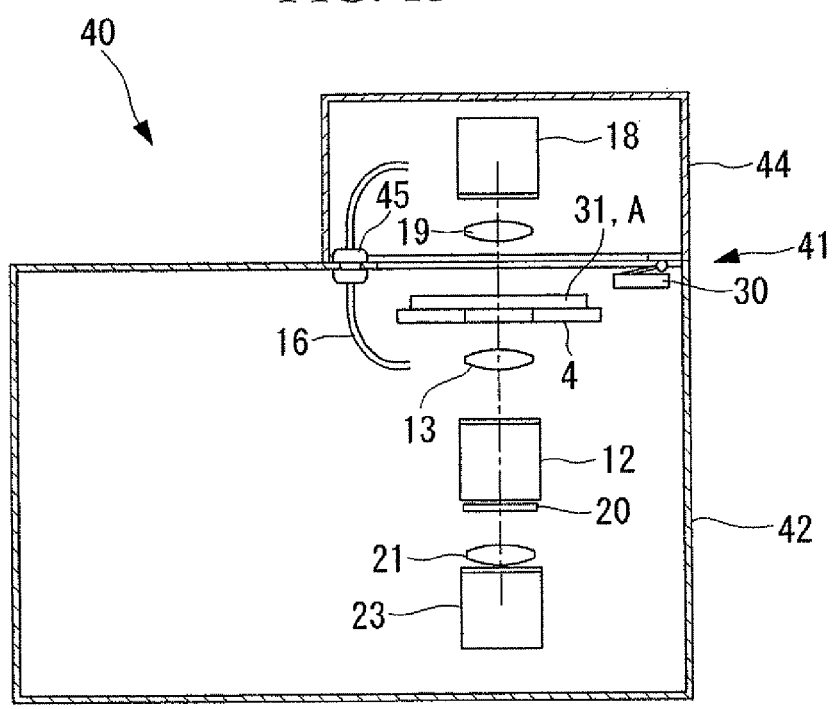
FIG. 13 is a longitudinal sectional view of the side of the optical microscope apparatus shown in FIG. 12, where the movable housing is in a closed state.
Figure 14:
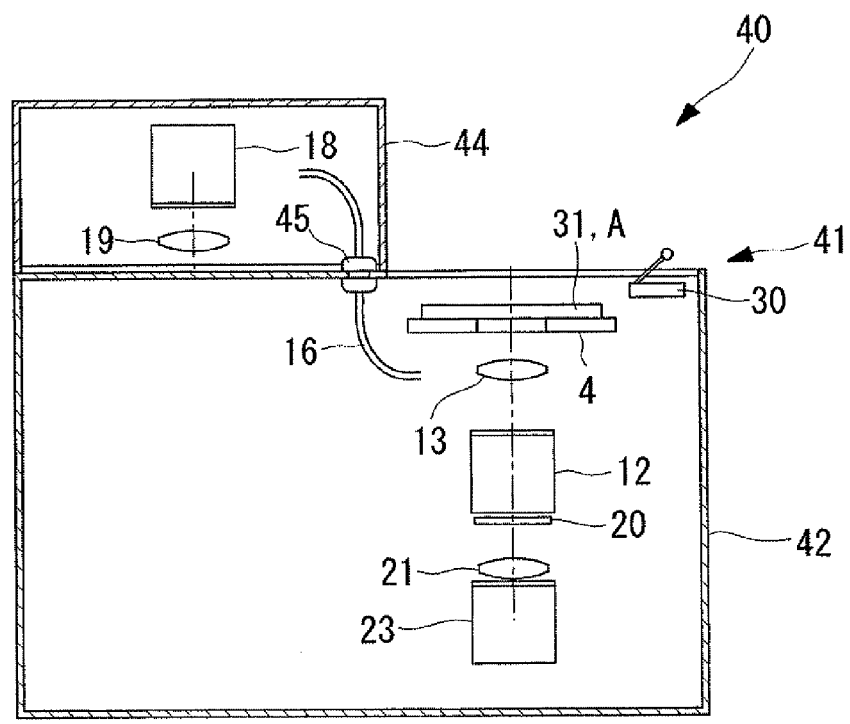
FIG. 14 is a longitudinal sectional view of the side of the optical microscope apparatus shown in FIG. 12, where the movable housing is in an open state.
Figure 15:
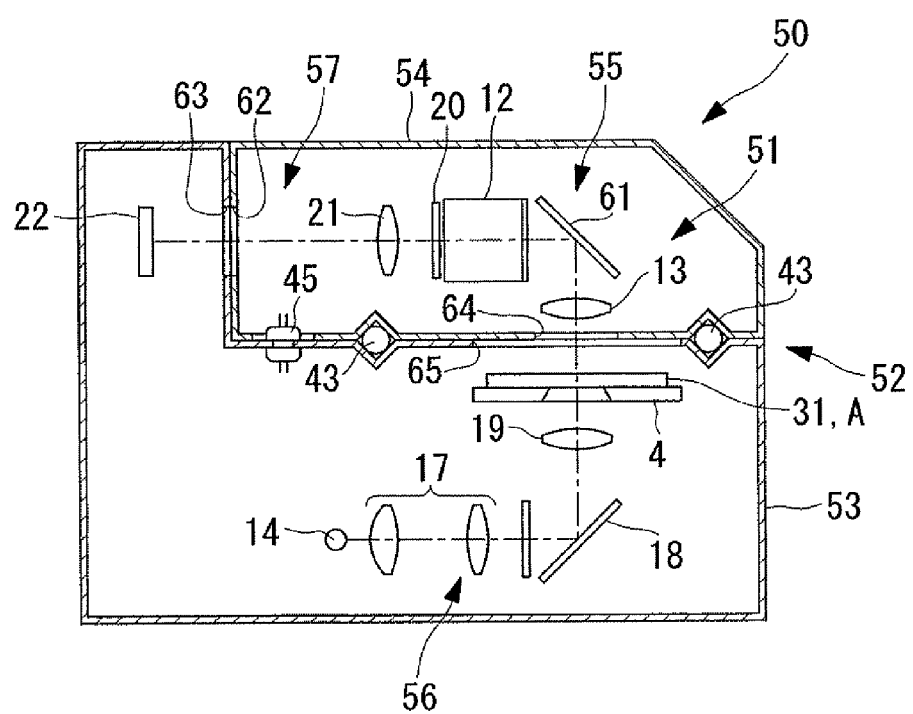
FIG. 15 is a schematic longitudinal sectional view illustrating, in outline, an optical microscope apparatus according to a third embodiment of the present invention.
Figure 16:
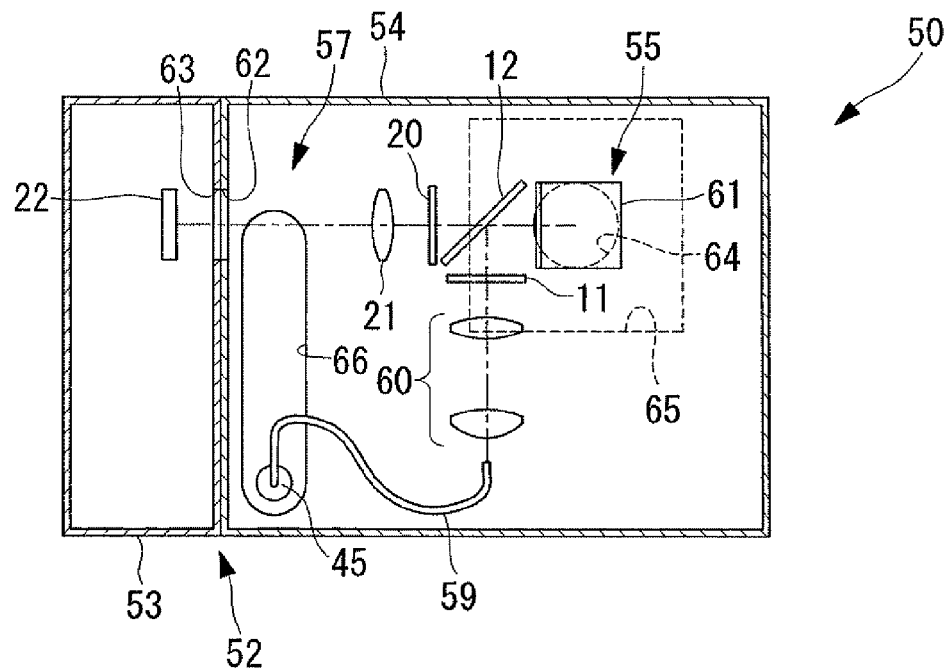
FIG. 16 is a longitudinal sectional view of the top of the optical microscope apparatus shown in FIG. 15, where the movable housing is in a closed state.

As shown in FIGS. 15, 16, and 13, when the movable housing 54 is at a closed position relative to the fixed housing 53, the optical axis of the objective lens 13 of the detection optical system 57 substantially aligns with the optical axis of the condenser lens 19 of the transmission-illumination optical system 56. At this position, the movable housing 54 is maintained at a fixed position by the action of a clicking mechanism (not shown). This state is a light-blocked state in which outside light is blocked from entering the space inside the housing 52.

Figure 17:
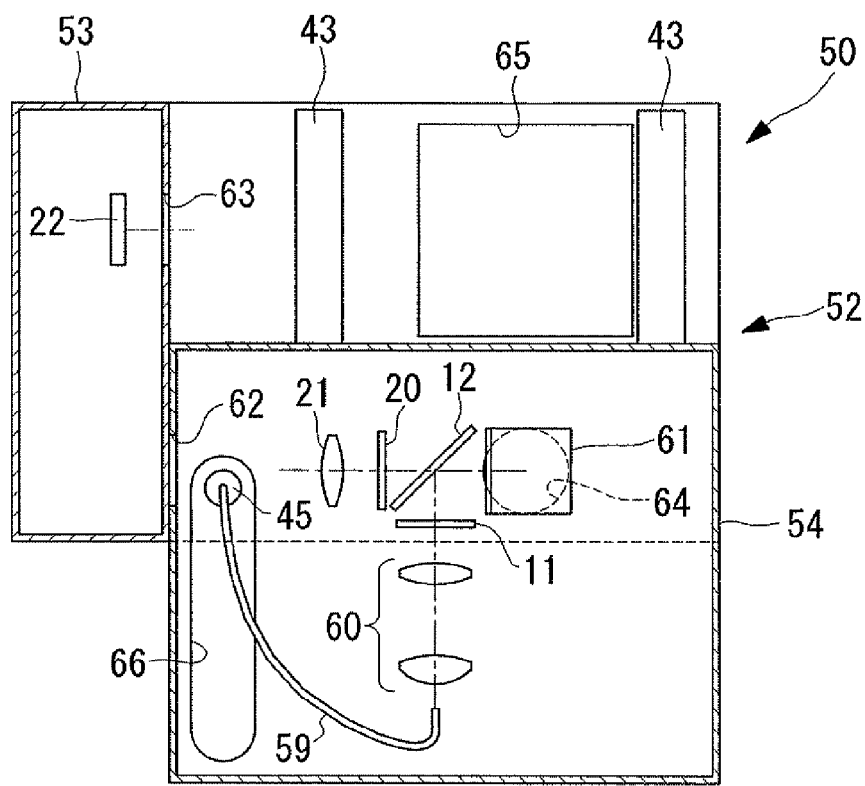
FIG. 17 is a longitudinal sectional view of the top of the optical microscope apparatus shown in FIG. 15, where the movable housing is in an open state.
Figure 18:
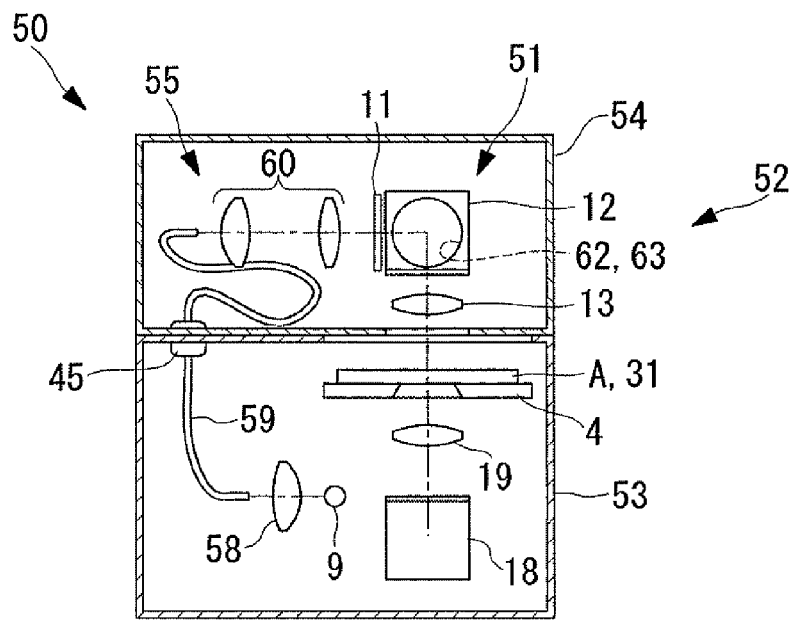
FIG. 18 is a longitudinal sectional view of the side of the optical microscope apparatus in the state shown in FIG. 16.
Figure 19:
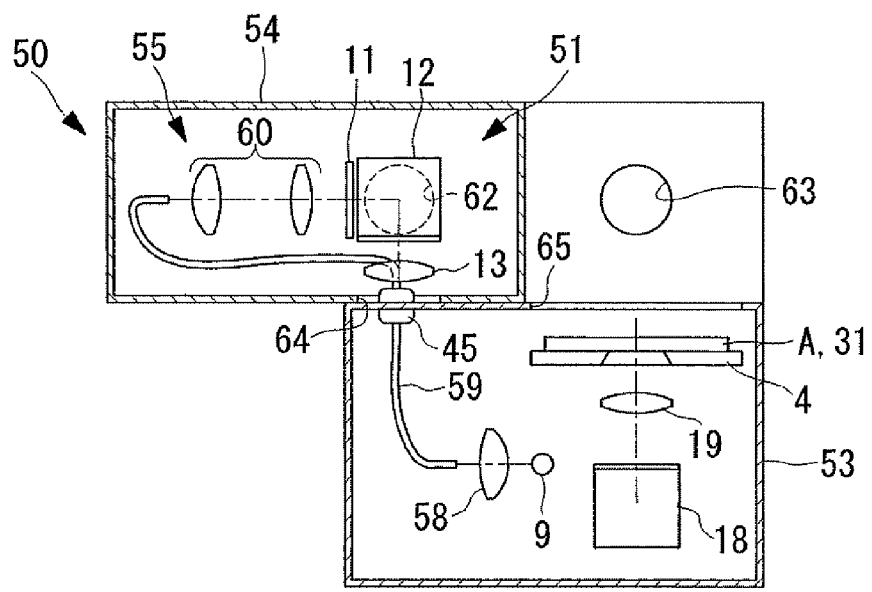
FIG. 19 is a longitudinal sectional view of the side of the optical microscope apparatus in the state shown in FIG. 17.

In contrast, as shown in FIGS. 17 and 19, when the operator moves the movable housing 54 to an open state, the detection optical system 57 and the epi-illumination optical system 55 are retracted together with the movable housing 54. Therefore, a large space can be formed above the motorized stage 4. In this way, the operator can easily change and fix the specimen A in this large space.

In the optical microscope apparatus 50 according to the third embodiment, the main optical parts of the detection optical system 57 and the epi-illumination optical system 55 are disposed in the movable housing 54, but the CCD camera 22 and the xenon lamp 9 are disposed in the fixed housing 53. Therefore, electrical wiring does not have to be provided in the movable housing 54. In this way, there is no need to reposition electrical wires when opening and closing the movable housing 54.

By disposing the CCD camera 22 inside the fixed housing 53, a large cooled CCD camera having a relatively large weight can be used. Consequently, a clear image with less noise can be acquired. Since the apparatus can be opened and closed by merely sliding the movable housing 54 in the horizontal direction relative to the fixed housing 53, there is an advantage in that a large force is not required for operation.

Figure 20:
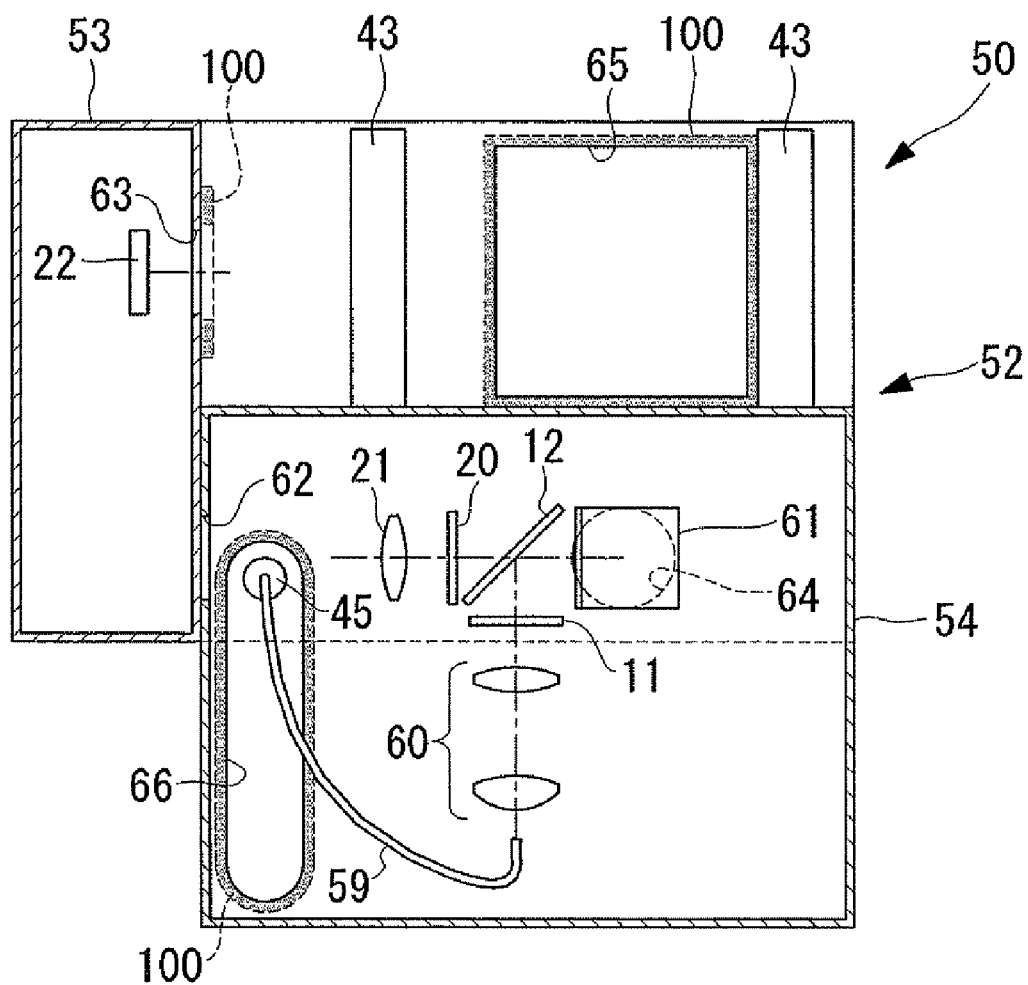
FIG. 20 is a longitudinal sectional view of the top of an optical microscope apparatus according to a modification of the third embodiment, where the movable housing is in an open state.

As shown in FIG. 20, also in the third embodiment, a light-blocking member 100 that seals the gap between the fixed housing 53 and the movable housing 54 when the movable housing 54 is closed relative to the fixed housing 53 may be provided around the through-holes 63 and 65 and the longitudinal hole 66 formed in the fixed housing 53 and the movable housing 54. In this way, outside light can be prevented from intruding into the housing 52 through the gap between the movable housing 54 and the fixed housing 53. The light-blocking member 100 may be a sheet composed of black rubber, plastic, or a metal cap.

The invention claimed is:

1. An optical microscope apparatus comprising:
a microscope having a stage for mounting a specimen, a transmission-illumination optical system, and an image-forming optical system; and
a housing surrounding the microscope,
wherein the housing includes a fixed housing and a movable housing provided in such a manner as to be openable and closeable relative to the fixed housing,
wherein, among optical parts constituting the transmission-illumination optical system or the image-forming optical system, at least some optical parts disposed above the stage are movable,
wherein a switching mechanism is provided, the switching mechanism being configured to retract said some optical parts away from an optical axis of another optical system when the movable housing is disposed in an open position relative to the fixed housing and to substantially align the optical axes of both optical systems when the movable housing is disposed in a closed position,
wherein the optical microscope apparatus further comprising:
a sensor for detecting an open state or a closed state of the movable housing relative to the fixed housing; and
a control unit for controlling the position of the stage by receiving a detection signal from the sensor.

2. The optical microscope apparatus according to claim 1, wherein the switching mechanism is formed by fixing said some optical parts to the movable housing.

3. The optical microscope apparatus according to claim 1, wherein the movable housing is attached to the fixed housing in a slidable manner.

4. The optical microscope apparatus according to claim 1, wherein the movable housing is attached to the fixed housing in a translatable manner.

5. The optical microscope apparatus according to claim 1, wherein a microplate containing a specimen is mountable on the stage.

6. The optical microscope apparatus according to claim 1, wherein said some optical parts are attached to the movable housing, and the transmission-illumination optical system further includes a light source, said some optical parts, and an optical fiber for transmitting illumination light from the light source to the some optical parts.

7. The optical microscope apparatus according to claim 6 wherein the light source is attached to the fixed housing.

8. The optical microscope apparatus according to claim 1, wherein anti-reflection treatment for visible light is applied to the inner walls of the fixed housing and the movable housing.

9. The optical microscope apparatus according to claim 1, further comprising:
a light-blocking member for blocking light from entering a gap between the fixed housing and the movable housing when the movable housing is closed relative to the fixed housing.

10. The optical microscope apparatus according to claim 1, wherein edges of the fixed housing and the movable housing have an engaged structure when the movable housing is closed relative to the fixed housing.

11. An optical microscope apparatus comprising:
a microscope having a stage for mounting a specimen, a transmission-illumination optical system, and an image-forming optical system; and
a housing surrounding the microscope,
wherein the housing includes a fixed housing and a movable housing provided in such a manner as to be openable and closeable relative to the fixed housing,
wherein, among optical parts constituting the transmission-illumination optical system or the image-forming optical system, at least some optical parts disposed above the stage are movable,
wherein a switching mechanism is provided, the switching mechanism being configured to retract said some optical parts away from an optical axis of another optical system when the movable housing is disposed in an open position relative to the fixed housing and to substantially align the optical axes of both optical systems when the movable housing is disposed in a closed position,
wherein the optical microscope apparatus further comprising:

a sensor for detecting an open state or a closed state of the movable housing relative to the fixed housing, and wherein the image-forming optical system further includes image-acquisition parts for acquiring an image of a specimen on the stage and a control unit for controlling the image-acquisition parts by receiving a detection signal from the sensor.

12. The optical microscope apparatus according to claim 11, wherein the switching mechanism is formed by fixing said some optical parts to the movable housing.

13. The optical microscope apparatus according to claim 11, wherein the movable housing is attached to the fixed housing in a slidable manner.

14. The optical microscope apparatus according to claim 11, wherein the movable housing is attached to the fixed housing in a translatable manner.

15. The optical microscope apparatus according to claim 11, wherein a microplate containing a specimen is mountable on the stage.

16. The optical microscope apparatus according to claim 11, wherein said some optical parts are attached to the movable housing, and the transmission-illumination optical system further includes a light source, said some optical parts, and an optical fiber for transmitting illumination light from the light source to the some optical parts.

17. The optical microscope apparatus according to claim 16 wherein the light source is attached to the fixed housing.

18. The optical microscope apparatus according to claim 11, wherein anti-reflection treatment for visible light is applied to the inner walls of the fixed housing and the movable housing.

19. The optical microscope apparatus according to claim 11, further comprising:
a light-blocking member for blocking light from entering a gap between the fixed housing and the movable housing when the movable housing is closed relative to the fixed housing.

20. The optical microscope apparatus according to claim 11, wherein edges of the fixed housing and the movable housing have an engaged structure when the movable housing is closed relative to the fixed housing.

21. An optical microscope apparatus comprising:
a microscope having a stage for mounting a specimen, a transmission-illumination optical system, and an image-forming optical system; and
a housing surrounding the microscope,
wherein the housing includes a fixed housing and a movable housing provided in such a manner as to be openable and closeable relative to the fixed housing,
wherein, among optical parts constituting the transmission-illumination optical system or the image-forming optical system, at least some optical parts disposed above the stage are movable,
wherein a switching mechanism is provided, the switching mechanism being configured to retract said some optical parts away from an optical axis of another optical system when the movable housing is disposed in an open position relative to the fixed housing and to substantially align the optical axes of both optical systems when the movable housing is disposed in a closed position,
wherein the optical microscope apparatus further comprising:
a sensor for detecting an open state or a closed state of the movable housing relative to the fixed housing;
a light source for illuminating a specimen on the stage; and
a control unit for controlling the light source by receiving a detection signal from the sensor.

22. The optical microscope apparatus according to claim 21, wherein the switching mechanism is formed by fixing said some optical parts to the movable housing.

23. The optical microscope apparatus according to claim 21, wherein the movable housing is attached to the fixed housing in a slidable manner.

24. The optical microscope apparatus according to claim 21, wherein the movable housing is attached to the fixed housing in a translatable manner.

25. The optical microscope apparatus according to claim 21, wherein a microplate containing a specimen is mountable on the stage.

26. The optical microscope apparatus according to claim 21, wherein said some optical parts are attached to the movable housing, and the transmission-illumination optical system further includes a light source, said some optical parts, and an optical fiber for transmitting illumination light from the light source to the some optical parts.

27. The optical microscope apparatus according to claim 26 wherein the light source is attached to the fixed housing.

28. The optical microscope apparatus according to claim 21, wherein anti-reflection treatment for visible light is applied to the inner walls of the fixed housing and the movable housing.

29. The optical microscope apparatus according to claim 21, further comprising:
a light-blocking member for blocking light from entering a gap between the fixed housing and the movable housing when the movable housing is closed relative to the fixed housing.

30. The optical microscope apparatus according to claim 21, wherein edges of the fixed housing and the movable housing have an engaged structure when the movable housing is closed relative to the fixed housing.

31. An optical microscope apparatus comprising:
a microscope having a stage for mounting a specimen, a transmission-illumination optical system, and an image-forming optical system; and
a housing surrounding the microscope,
wherein the housing includes a fixed housing and a movable housing provided in such a manner as to be openable and closeable relative to the fixed housing,
wherein, among optical parts constituting the transmission-illumination optical system or the image-forming optical system, at least some optical parts disposed above the stage are movable,
wherein a switching mechanism is provided, the switching mechanism being configured to retract said some optical parts away from an optical axis of another optical system when the movable housing is disposed in an open position relative to the fixed housing and to substantially align the optical axes of both optical systems when the movable housing is disposed in a closed position,
wherein the optical microscope apparatus further comprising:
a sensor for detecting an open state or a closed state of the movable housing relative to the fixed housing;
a temperature regulator for regulating the temperature inside the housing;
a control unit for controlling the temperature regulator by receiving a detection signal from the sensor;
a carbon-dioxide-gas supplier for adjusting the carbon-dioxide-gas concentration inside the housing; and
a control unit for controlling the carbon-dioxide-gas supplier by receiving a detection signal from the sensor.

32. The optical microscope apparatus according to claim 31, wherein the switching mechanism is formed by fixing said some optical parts to the movable housing.

33. The optical microscope apparatus according to claim 31, wherein the movable housing is attached to the fixed housing in a slidable manner.

34. The optical microscope apparatus according to claim 31, wherein the movable housing is attached to the fixed housing in a translatable manner.

35. The optical microscope apparatus according to claim 31, wherein a microplate containing a specimen is mountable on the stage.

36. The optical microscope apparatus according to claim 31, wherein said some optical parts are attached to the movable housing, and the transmission-illumination optical system further includes a light source, said some optical parts, and an optical fiber for transmitting illumination light from the light source to the some optical parts.

37. The optical microscope apparatus according to claim 36 wherein the light source is attached to the fixed housing.

38. The optical microscope apparatus according to claim 31, wherein anti-reflection treatment for visible light is applied to the inner walls of the fixed housing and the movable housing.

39. The optical microscope apparatus according to claim 31, further comprising:
   a light-blocking member for blocking light from entering a gap between the fixed housing and the movable housing when the movable housing is closed relative to the fixed housing.

40. The optical microscope apparatus according to claim 31, wherein edges of the fixed housing and the movable housing have an engaged structure when the movable housing is closed relative to the fixed housing.

* * * * *